United States Patent [19]

Richardson, Jr.

[11] 3,714,157
[45] Jan. 30, 1973

[54] PROCESS FOR THE DECOLORIZATION OF 7-[α-(4-PYRIDYLTHIO)ACETAMIDO] CEPHALOSPORANIC ACID

[75] Inventor: Elwin J. Richardson, Jr., Kirkville, N.Y.

[73] Assignee: Bristol-Myers Company, New York, N.Y.

[22] Filed: Oct. 23, 1970

[21] Appl. No.: 83,599

[52] U.S. Cl. ............................... 260/243 C, 424/246
[51] Int. Cl. ............................................ C07d 99/24
[58] Field of Search ................................. 260/243 C

[56] References Cited

UNITED STATES PATENTS

| | | | |
|---|---|---|---|
| 3,422,100 | 1/1969 | Crast | 260/243 C |
| 3,503,967 | 3/1970 | Silvestri et al. | 260/243 C |
| 3,578,661 | 5/1971 | Havranek et al. | 260/243 C |

Primary Examiner—Nicholas S. Rizzo
Attorney—Herbert W. Taylor, Jr., Richard H. Brink, James Magee, Jr. and Robert E. Havranek

[57] ABSTRACT

The purification and decolorization of 7-[α-(4-pyridylthio)-acetamido]cephalosporanic acid has been accomplished by the recrystallization of the acid from dimethylformamide (DMF) containing a quantity of ascorbic acid. The essentially pure, colorless product crystallizes from solution as a DMF solvate.

11 Claims, No Drawings

PROCESS FOR THE DECOLORIZATION OF 7-[α-(4-PYRIDYLTHIO)ACETAMIDO] CEPHALOSPORANIC ACID

BACKGROUND OF THE INVENTION

1. Field of the Invention

This invention relates to the purification and decolorization of a cephalosporin by the recrystallization of the cephalosporin as a solvate from a solvent containing an organic acid.

2. Description of the Prior Art

The prior art reveals many methods of purification and decolorization of organic compounds. However, inasmuch as each compound differs in its physical characteristics there is no universal procedure adaptable to all. It has taken much time and effort to discover the method of purification and decolorization of the compound described herein.

SUMMARY OF THE INVENTION

7-[α-(4-Pyridylthio)acetamido]cephalosporanic acid has been purified and decolorized by recrystallizing the compound as a solvate from an organic solvent such as dimethylformamide, formamide or dimethylacetamide in the presence of a small quantity of an organic acid such as citric or ascorbic acid.

COMPLETE DISCLOSURE

7-[α-(4-Pyridylthio)acetamido]cephalosporanic acid and the pharmaceutically acceptable salts thereof are valuable compounds useful as antibacterial agents, as nutritional supplements in animal feeds, as agents for the treatment of mastitis in cattle, and as therapeutic agents in poultry and animals, including man, in the treatment of infectious diseases caused by gram-positive and gram-negative bacteria.

It has been our experience in both small and large scale preparation of these compounds, that the compounds invariably discolor and darken upon the use of ordinary purification and recrystallization procedures (U. S. Pat. Nos. 3,422,100 and 3,503,967).

A multitude of procedures had been tried to remove the trace materials responsible for the color in the solutions or solids but only with limited success inasmuch as all the methods employed seemed to generate additional colored impurities. While the colored impurity has not been identified, it is thought that it results from the partial oxidation of the cephalosporin product during the preparative procedures. Attempts at decolorization using charcoal, chromatography or other adsorption techniques were less than satisfactory. Recrystallization likewise failed.

It was therefore an object of this invention to find a method for the production of colorless 7-[α-(4-pyridylthio)acetamido]-cephalosphoranic acid.

The objective of the present invention has been achieved by the provision according to the present invention, of the process for the purification of the compound 7-[α-(4-pyridylthio)acetamido]-cephalosporanic acid which comprises A. preparing a solution comprised of impure 7-[α-(4-pyridylthio)acetamido]cephalosporanic acid, an organic solvent selected from the group comprised of dimethylformamide, dimethylacetamide and formamide and an organic acid selected from the group comprised of ascorbic acid and citric acid; and B. recovering the spontaneously precipitated product as an essentially pure, colorless, crystalline solvate.

An embodiment of the present invention is the crystalline dimethylformamide, dimethylacetamide or formamide solvates of 7-[α-(4-pyridylthio)acetamido]cephalosporanic acid.

A more preferred embodiment of the present invention is the crystalline dimethylformamide, dimethylacetamide or formamide solvate of 7-[α-(4-pyridylthio)acetamido]cephalosporanic acid comprised of about 1 mole of dimethylformamide, dimethylacetamide or about 2 moles of formamide per mole of 7-[α-(4-pyridylthio)acetamido]cephalosporanic acid.

A most preferred embodiment is the crystalline dimethylformamide solvate of 7-[α-(4-pyridylthio)acetamido]cephalosporanic acid comprised of 1 mole of dimethylformamide per mole of 7-[α-(4-pyridylthio)acetamido]cephalosporanic acid.

Another most preferred embodiment is the crystalline dimethylacetamide solvate of 7-[α-(4-pyridylthio)acetamido]cephalosporanic acid comprised of 1 mole of dimethylacetamide per mole of 7-[α-(4-pyridylthio)acetamido]cephalosporanic acid.

A preferred embodiment of the present invention is the process of purification of 7-[α-(4-pyridylthio)acetamido]cephalosporanic acid which comprises A. preparing a solution comprised of impure 7-[α-(4-pyridylthio)acetamido]cephalosporanic acid, an organic solvent selected from the group comprised of dimethylformamide, dimethylacetamide and formamide and an organic acid selected from the group comprised of ascorbic acid and citric acid; and B. recovering the spontaneously precipitated product as an essentially pure, colorless, crystalline solvate.

A more preferred embodiment is the process of purification of 7-[α-(4-pyridylthio)acetamido]cephalosporanic acid which comprises A. preparing a solution comprised of at least one part by weight of impure 7-[α-(4-pyridylthio)acetamido]cephalosporanic acid, 20 parts by weight of an organic solvent selected from the group comprised of dimethylformamide, dimethylacetamide and formamide, and at least 0.1 part by weight of an organic acid selected from the group comprised of ascorbic acid or citric acid; and B. recovering the spontaneously precipitated product as an essentially pure, colorless, crystalline solvate by filtration.

A most preferred embodiment is the process of purification of 7-[α-(4-pyridylthio)acetamido]cephalosporanic acid which comprises A. preparing a solution comprised of 1 part by weight of impure 7-[α-(4-pyridylthio)acetamido]cephalosporanic acid, about 8 to 12 parts by weight of dimethylformamide, dimethylacetamide or formamide, and about 0.4 to 0.6 parts by weight of citric acid or ascorbic acid; and B. recovering the spontaneously precipitated product as an essentially pure, colorless, crystalline solvate by filtration.

It has been found in our laboratories and pilot plant that during the normal production of 7-[α-(4-pyridylthio)acetamido]-cephalosporanic acid, the compound darkens to an off-white color that is undesirable in appearance. Attempts at ordinary procedures of purification and decolorization failed. In most cases, a 5 percent solution of the material prepared by ordinary procedures gave Klett photometer readings approaching 1000 when assayed using a blue filter (400–465 mμ). In contrast, the process of the instant invention produces 7-[α-(4-pyridylthio)acetamido]cephalosporanic acid which assays at one-fifth to one-tenth that value as a 10 percent solution. It is theorized that the citric or ascorbic acid in the recrystallization media are acting as antioxidants and/or chelating agents.

The solvates of the present invention are primarily intermediates in the preparation of a final medicinal form of 7-[α-(4-pyridylthio)acetamido]cephalosporanic acid. As such they serve as a convenient way of producing essentially pure, colorless product.

One medicinal form, sodium 7-[α-(4-pyridylthio)acetamido]-cephalosporanate, is prepared by dissolving the solvate in methylene chloride in the presence an equimolar quantity of triethylamine. The cephalosporanic acid is then stoichiometrically titrated with sodium ethylhexanoate to produce the sodium salt which is collected by filtration.

The sodium salt so produced gives Klett photometer readings below 200 when assayed using a 10 percent solution and a blue filter.

In general, solvate or sodium salt having a reading of 200 or less on a Klett photometer when assayed using a 10 percent solution and blue filter (400–465 mμ) is considered satisfactory.

In all cases, the Klett photometer readings are taken on a Klett photometer standardized at zero against distilled water.

EXAMPLES OF PREFERRED EMBODIMENTS

EXAMPLE 1

Recrystallized 7-[α-(4-pyridylthio)acetamido]cephalosporanic acid (10.6 g., 0.025 mole) having a Klett value of 550 at 10 percent concentration when dissolved in saturated sodium bicarbonate solution using a blue filter (400–465 mμ) was dissolved in a solution of 100 ml. of dimethylformamide (DMF) and 4.8 g. (0.025 mole) of citric acid at room temperature. A solid started crystallizing out of solution after 15 minutes. The solid was collected by filtration after 1 hour, was washed with acetone and dried in a vacuum oven to yield 6.53 g. The solid was determined to be approximately 1:1 solvate (complex) of dimethylformamide and 7-[α-(4-pyridylthio)acetamido]cephalosporanic acid. A 10 percent solution of the compound in saturated sodium bicarbonate gave a Klett photometer reading of 95 when using a blue filter (400–465 mμ).

EXAMPLE 2

Recrystallized 7-[α-(4-pyridylthio)acetamido]cephalosporanic acid (10.6 g., 0.025 mole) having a Klett value of 550 at 10 percent concentration when dissolved in saturated sodium bicarbonate solution using a blue filter (400–465 mμ) was dissolved in a solution of 100 ml. of DMF and 4.4 g. (0.025 mole) of ascorbic acid at room temperature. A solid crystallized from solution and was collected by filtration to yield 7.9 grams of material determined to be 7-α-(4-pyridylthio)acetamido]-cephalosporanic acid solvated with an equimolar quantity of DMF. A 10 percent solution of the solvate dissolved in saturated sodium bicarbonate gave a Klett photometer reading af 75 using a blue filter (400–465 mμ).

EXAMPLE 3

Crude 7-[α-(4-pyridylthio)acetamido]cephalosporanic acid (10.6 g., 0.025 mole) having a Klett value of 545 at 5 percent concentration when dissolved in saturated sodium bicarbonate solution using a blue filter (400–465 mμ) was slurried in a solution of 50 ml. of DMF and 4.4 g. of ascorbic acid at room temperature. Some solids were always present but that which dissolved recrystallized from solution after 15–30 minutes. The solids were collected after 1 hour and were determined to be a 1:1 DMF-cephalosporanic acid solvate. A 10 percent solution of the solvate dissolved in saturated sodium bicarbonate solution gave a Klett photometer reading of 180 when using a blue filter (400–465 mμ).

EXAMPLE 4

7-[α-(4-Pyridylthio)acetamido]cephalosporanic acid (15 gm.), having a Klett value of 580 at 10 percent concentration when dissolved in saturated sodium bicarbonate solution using a blue filter (400–465 mμ), was dissolved in a solution of 50 ml. of dimethylacetamide (DMAC) and 5 g. of ascorbic acid at room temperature. After one hour, 12.1 g. of crystalline product was collected by filtration and it was determined to be a 1:1 solvate of DMAC and the cephalosporanic acid. A 10 percent solution of the compound in saturated sodium bicarbonate gave a Klett photometer reading of 120 when using a blue filter (400–465 mμ).

EXAMPLE 5

7-[α-(4-Pyridylthio)acetamido]cephalosporanic acid (10 g.) having a Klett photometer reading of 580 at 10 percent concentration when dissolved in a saturated sodium bicarbonate solution using a blue filter (400–465 mμ), was dissolved in a solution of 100 ml. of formamide and 5 g. ascorbic acid at room temperature. After 1 hour, 10.34 g. of solid was collected by filtration and was determined to be about a 2:1 solvate of formamide and cephalosporanic acid. A 10 percent solution of the solvate dissolved in saturated sodium bicarbonate solution gave a Klett reading of 325 using a blue filter (400–465 mμ).

EXAMPLE 6

A. One kilogram of finely powdered crude 7-[α-(4-pyridylthio)-acetamido]cephalosporanic acid was added over 15 minutes to a stirred solution of 500 g. of ascorbic acid and 10 liters of dimethylformamide at 25° C. The solution, and ultimate slurry, was stirred for 1 hour at 25° C. and then 1 hour at 5°–10° C. The solids were collected by filtration. The cake was washed with acetone and then dried under vacuum at 25° C. to give yield A.

B. An additional one kilogram of crude 7-[α-(4-pyridylthio)-acetamido]cephalosporanic acid was added to the mother liquors of DMF-ascorbic acid obtained in step A under identical conditions to those performed in step A. Additional decolorized product was obtained.

C. The purification and decolorization process can be repeated up to 5 times by recycling the mother liquors obtained from the previous step. As a general rule, six uses of the DMF-ascorbic acid (5 recycles) yields DMF-cephalosporanic acid solvate having a Klett value of 200 or below when assaying a 10 percent solution in saturated sodium bicarbonate using a blue filter (400–465 mμ). The overall recovery of solvate from 6 kg. of crude acid is about 6 kg. of decolorized solvate.

I claim:

1. A crystalline solvate consisting of about 1 mole of dimethylformamide, dimethylacetamide or about 2 moles of formamide per mole of 7-[α-(4-pyridylthio)acetamido]-cephalosporanic acid.

2. A crystalline solvate of claim 1 consisting of 1 mole of dimethylformamide per mole of 7-[α-(4-pyridylthio)acetamido]cephalosporanic acid.

3. A crystalline solvate of claim 1 consisting of 1 mole of dimethylacetamide per mole of 7-[α-(4-pyridylthio)acetamido]cephalosporanic acid.

4. A crystalline solvate of claim 1 consisting of 2 moles of formamide per mole of 7-[α-(4-pyridylthio)-acetamido]cephalosporanic acid.

5. The process of purifying 7-[α-(4-pyridylthio)acetamido]cephalosporanic acid which comprises A. preparing a solution comprised of impure 7-[α-(4-pyridylthio)acetamido]cephalosporanic acid, an organic solvent selected from the group comprised of dimethylformamide, dimethylacetamide and formamide and an organic acid selected from the group comprised of ascorbic acid and citric acid; and B recovering the spontaneously precipitated product as an essentially pure, colorless, crystalline solvate.

6. The process of claim 5 which comprises

A. preparing a solution comprised of at least one part by weight of impure 7-[α-(4-pyridylthio)acetamido]cephalosporanic acid, 20 parts by weight of an organic solvent selected from the group comprised of dimethylformamide, dimethylacetamide and formamide, and at least 0.1 part by weight of an organic acid selected from the group comprised of ascorbic acid or citric acid; and B. recovering the spontaneously precipitated product as an essentially pure, colorless, crystalline solvate by filtration.

7. The process of claim 5 which comprises

A. preparing a solution comprised of 1 part by weight of impure 7-[α-(4-pyridylthio)acetamido]cephalosporanic acid, about 8 to 12 parts by weight of dimethylformamide, dimethylacetamide or formamide, and about 0.4 to 0.6 parts by weight of citric acid or ascorbic acid; and B. recovering the spontaneously precipitated product as an essentially pure, colorless, crystalline solvate by filtration.

8. The process of claim 7 wherein the solvent is dimethylformamide and the organic acid is ascorbic acid.

9. The process of claim 7 wherein the solvent is dimethylacetamide and the organic acid is ascorbic acid.

10. The process of claim 7 wherein the solvent is formamide and the organic acid is ascorbic acid.

11. The process of claim 7 wherein the solvent is 10 parts by weight of dimethylformamide and the organic acid is 0.5 parts by weight of ascorbic acid.

* * * * *